United States Patent [19]
Mohri et al.

[11] Patent Number: 4,760,314
[45] Date of Patent: Jul. 26, 1988

[54] ROTATION CONTROLLER FOR A DIFFERENTIAL ACTUATOR

[75] Inventors: Naotake Mohri, 3837-3, Shimada Kuroishi, Tenpakucho Tenpaku-ku, Nagoya-shi, Aichi; Nagao Saito, Tokyo; Yoshihiko Yanai; Kuniharu Miura, both of Aichi, all of Japan

[73] Assignees: Naotake Mohri, Aichi; Mitsubishi Denki Kabushiki Kaisha, Tokyo, both of Japan

[21] Appl. No.: 905,963

[22] Filed: Sep. 11, 1986

[30] Foreign Application Priority Data

Oct. 11, 1985 [JP] Japan .................. 60-227231
Oct. 11, 1985 [JP] Japan .................. 60-227232

[51] Int. Cl.⁴ .............................................. H02P 7/573
[52] U.S. Cl. ........................................... 318/78; 318/8; 318/13
[58] Field of Search ............... 318/76, 77, 78, 430, 318/6, 7, 13, 8, 9, 11, 12; 242/75, 75.44, 75.51, 66

[56] References Cited

U.S. PATENT DOCUMENTS

| | | | |
|---|---|---|---|
| 1,874,094 | 8/1932 | Ford et al. | 318/76 X |
| 1,907,132 | 5/1933 | Thurston | 318/76 |
| 2,578,837 | 12/1951 | Raney | 318/8 |
| 2,678,414 | 5/1954 | Polasek | 318/8 |
| 2,733,391 | 1/1956 | Mayer | 318/78 X |
| 2,745,016 | 5/1956 | Kulikowski | 318/8 X |
| 2,796,565 | 6/1957 | Walcott | 318/76 X |
| 2,890,000 | 6/1959 | Beachler | 242/66 |
| 2,898,531 | 8/1959 | Gray | 318/76 X |
| 3,057,572 | 10/1962 | Rockstrom et al. | 242/66 |
| 3,164,760 | 1/1965 | King | 318/76 X |
| 3,697,763 | 10/1972 | Middlebrook | 318/8 X |
| 4,289,996 | 9/1981 | Barnes et al. | 318/8 X |
| 4,594,652 | 6/1986 | Mattson | 318/46 X |

FOREIGN PATENT DOCUMENTS

50-24661 3/1975 Japan .
52-67452 6/1977 Japan .
54-27660 3/1979 Japan .
59-140940 8/1984 Japan .

*Primary Examiner*—Bentsu Ro
*Attorney, Agent, or Firm*—Bernard, Rothwell & Brown

[57] ABSTRACT

A rotation control apparatus for a differential actuator includes two induction motors and a differential mechanism for producing a constant torque on its output shaft based on the differential speed of the induction motors. The appartus includes two inverters each located between one of the induction motors and a common power source for the induction motors and having individual voltage/frequency output characteristics. The inverters set separately the voltage/frequency output characteristics of power supplied to the induction motors so as to control the speed of the induction motors separately, thereby controlling the output torque on the output shaft of the differential actuator. And the output shaft of the differential actuator is controlled to constant speeds regardless of the load torque on the shaft based on the difference of setting frequencies on both inverters.

10 Claims, 12 Drawing Sheets

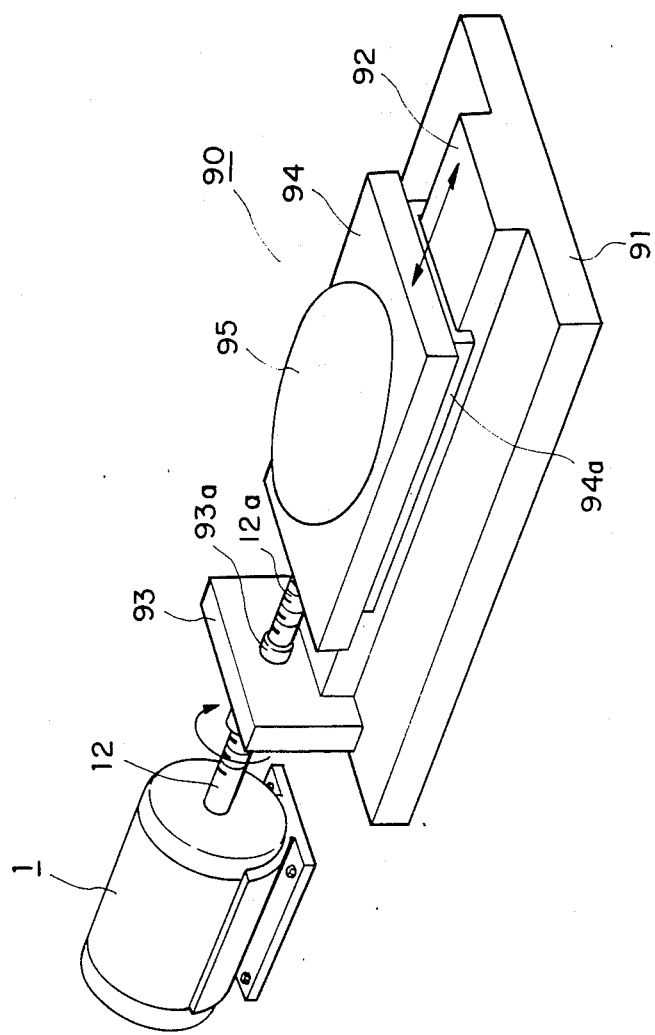

ROTATION CONTROLLER FOR A DIFFERENTIAL ACTUATOR

BACKGROUND OF THE INVENTION

1. Field of the Invention

The present invention relates to a rotation control apparatus for controlling the output torque and the rotational speed of a differential actuator having two induction motors and a differential mechanism.

2. Description of the Prior Art

FIG. 1 shows the conventional control circuit for the inverter which drives an induction motor used as an actuator. The control circuit includes an input terminal 101 in connection with an AC power source, an AC-to-DC converter 102 for transforming AC power into DC power, a smoothing circuit 103 for smoothing the transformed DC power, a DC-to-AC inverter 104 for transforming the smoothed DC power into AC power with arbitrary frequency, and an induction motor 105 driven by the AC power supplied by the inverter 104.

The operation of the above-mentioned actuator is as follows. The AC-to-DC converter 102 receives AC power of three-phase, for example, supplied through the AC power source terminal 101 and transforms the AC power into DC power. The smoothing circuit 103 makes the produced DC power smooth. The inverter 104 which operates in a switching manner in a certain sequence transforms the smoothed DC power into AC power with desired frequency, and supplies the AC power to the induction motor 105. The AC power produced by the inverter 104 has the voltage vs. frequency (v/f) characteristics as shown in FIG. 2, and the rotational speed of the induction motor 105 is controlled on the basis of the v/f characteristics shown.

When the inverter 104 produces the output voltage v in proportion to the output frequency f as shown in part of the v/f characteristics of FIG. 2, the induction motor 105 is driven with a constant torque characteristic as shown in FIG. 3(a) and 3(b), or when the inverter 104 produces a constant output voltage v irrespective of variable output frequency f as shown in part of FIG. 2, the induction motor 105 produces a constant output characteristic in a wide speed range.

The actuator torque controller arranged as described above is capable of torque control in the normal operating condition except for the lowest speed range as shown in FIG. 3(a). However, the torque ripple increases and the output is lacking in a sufficient and stable torque in the lowest speed range and therefore the torque control for the induction motor is difficult in this speed range.

When the induction motor 105 is rotated in the lowest speed range, the output frequency of the inverter 104 is under the limit so that the rotational speed control for the actuator is difficult, too.

In order to make up for above-mentioned defect in the lowest speed range, various types of differential actuator controllers using two motors have been proposed as disclosed, for example, in Japanese Patent Publication Laid-Open No. 54-27660 (published in 1979).

SUMMARY OF THE INVENTION

It is one object of this invention to provide a torque control apparatus for a differential actuator consisting of two induction motors and a differential mechanism in combination, wherein the two induction motors are controlled separately by respective inverters so that the actuator produces a sufficient and stable output torque in the entire speed range from stoppage to the normal operating speed.

The other object of this invention is to provide a rotational speed control apparatus for a differential actuator consisting of two induction motors and a differential mechanism in combination, wherein the two induction motors are controlled separately by associated inverters so that constant rotational speeds independent of the load torque are obtained on the output shaft of the differential actuator in the speed range from stoppage to the normal operating speed.

In order to achieve the above objects, the inventive rotation control apparatus for a differential actuator made up of two induction motors and a differential mechanism comprises two inverters for supplying power with intended frequencies separately to the induction motors so that the output torque and the rotational speed on the output shaft of the differential actuator are controlled to constant speeds based on the difference of power frequencies set for the inverters.

One induction motor is driven by the inverter providing a constant output frequency, while the other induction motor is driven by the inverter providing variable output frequencies, whereby both drivers operate in unison to produce a constant output torque in a wide speed range from stoppage to the normal operating speed. This operation is based on the differential characteristics of the differential mechanism which is capable of driving its output shaft at a zero speed even though the induction motors rotate at high speeds, and this control scheme is also effective for preventing the occurrence of the torque ripple. In addition, by setting the arbitrary output frequencies of both inverters, it is possible to reverse the output rotation or to change the output torque as desired.

BRIEF DESCRIPTION OF THE DRAWINGS

FIG. 15 is a perspective view of the conveyer mechanism to which this invention is applied.

DETAILED DESCRIPTION OF THE PREFERRED EMBODIMENTS

Embodiments of the inventive differential actuator rotation control apparatus will now be described in detail with reference to the drawings.

Figure 1:
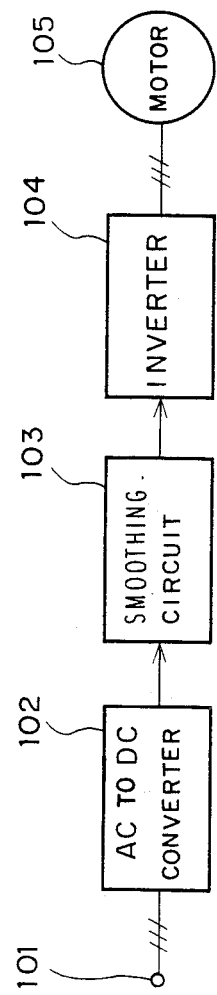
FIG. 1 is a block diagram showing the induction motor control circuit used in the conventional differential actuator rotation controller.
Figure 2:
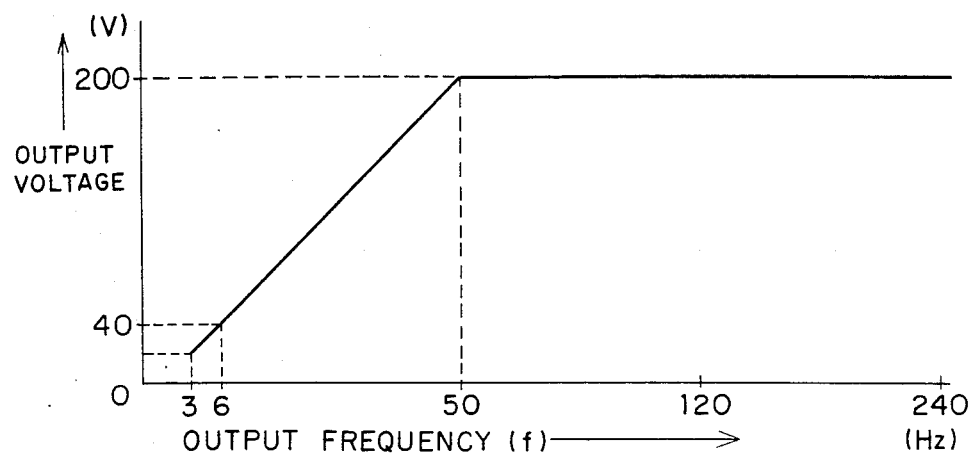
FIG. 2 is a graph showing the inverter output voltage vs. frequency characteristics employed in the conventional rotation controller.
Figure 3:
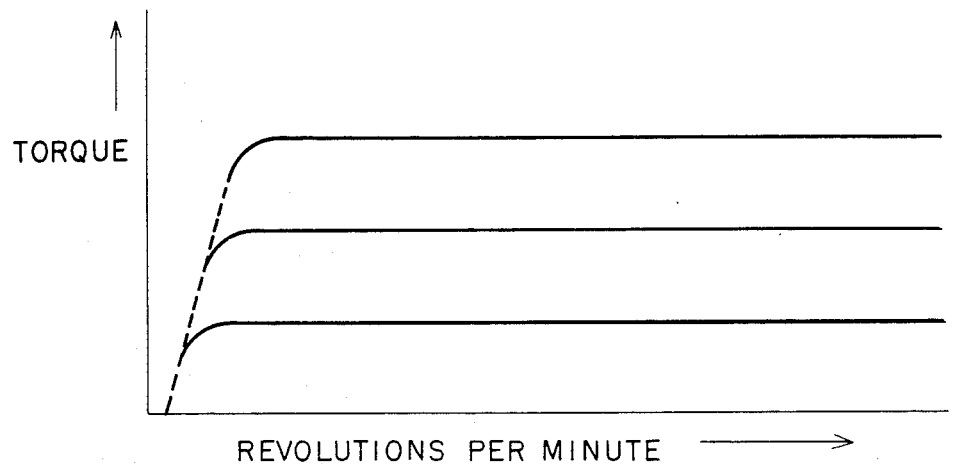
FIG. 3(a) and (b) are graphs showing the induction motor output torque vs. speed characteristics of the conventional rotation controller.
Figure 3:
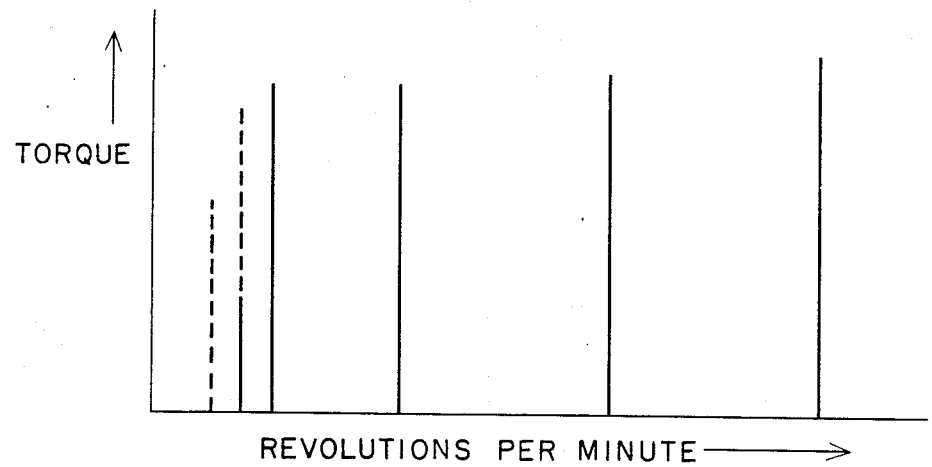
Figure 4:
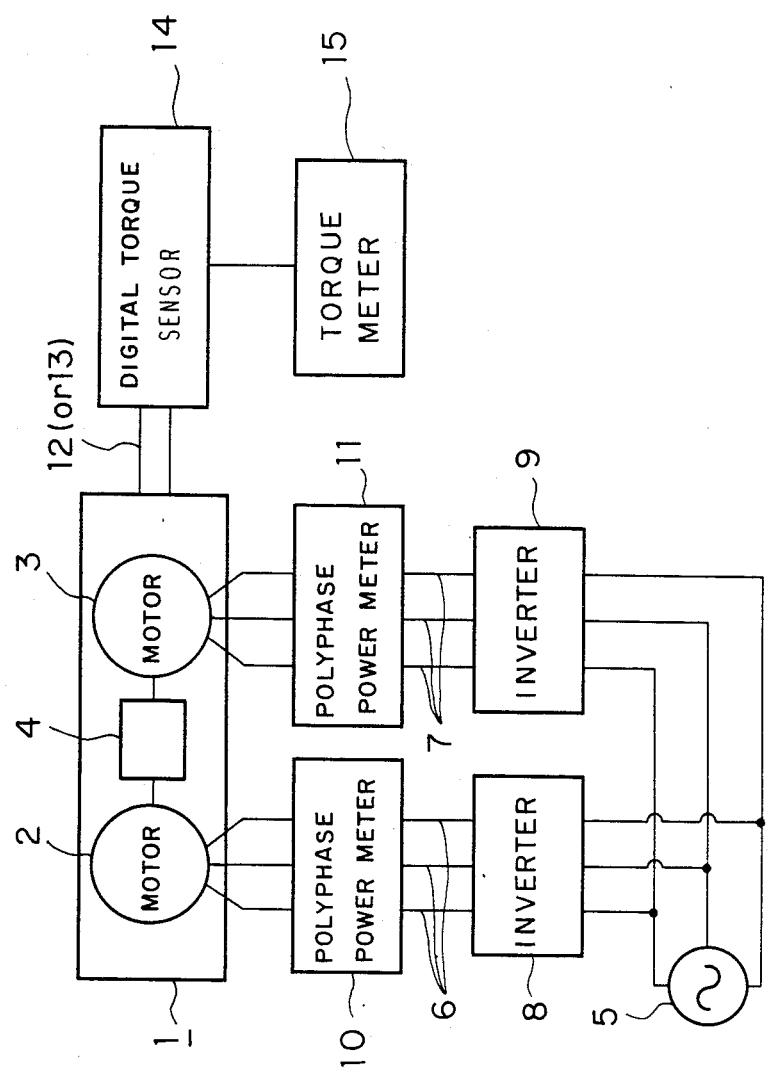
FIG. 4 is a block diagram showing an embodiment of this invention.

In FIG. 4, a differential actuator 1 is made up of two induction motors 2 and 3 having the same structure and same output characteristics and a differential mechanism 4. The induction motors 2 and 3 are supplied with power from a common 3-phase AC power source 5 through power lines 6 and 7, respectively, on which are provided two inverters 8 and 9 having the voltage vs. frequency characteristics as described previously using FIG. 2. Polyphase power meters 10 and 11 are inserted between the induction motor 2 and inverter 8 and between the motor 3 and inverter 9, respectively.

The differential actuator 1 has one output shaft 12 coupled with a digital torque sensor 14 for measuring in digital manner the output torque of the shaft 12, and a torque meter 15 for reading out the measured output torque is attached to the digital torque sensor 14.

Figure 5:
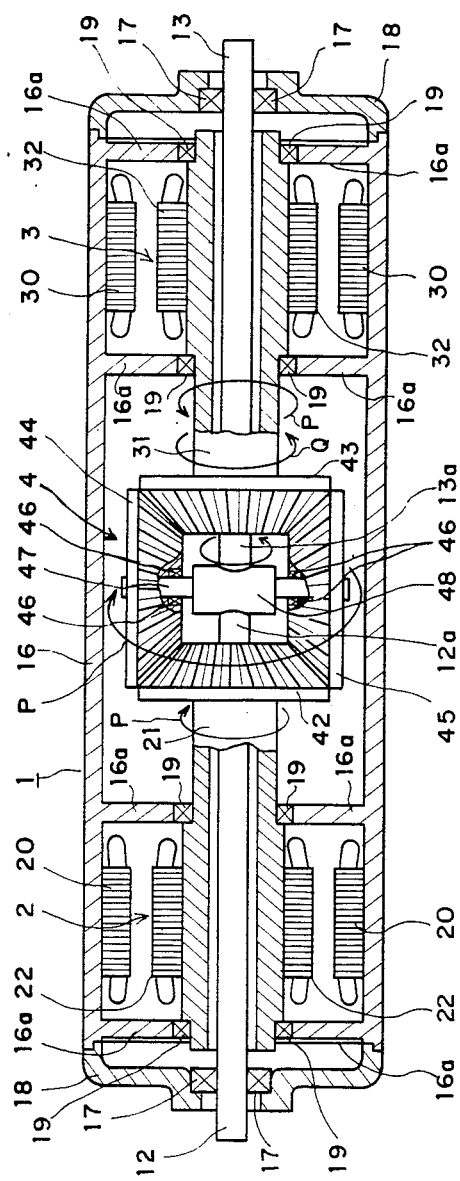
FIG. 5 is a view, substantially in section, partial showing the differential actuator used in the above embodiment.
Figure 6:
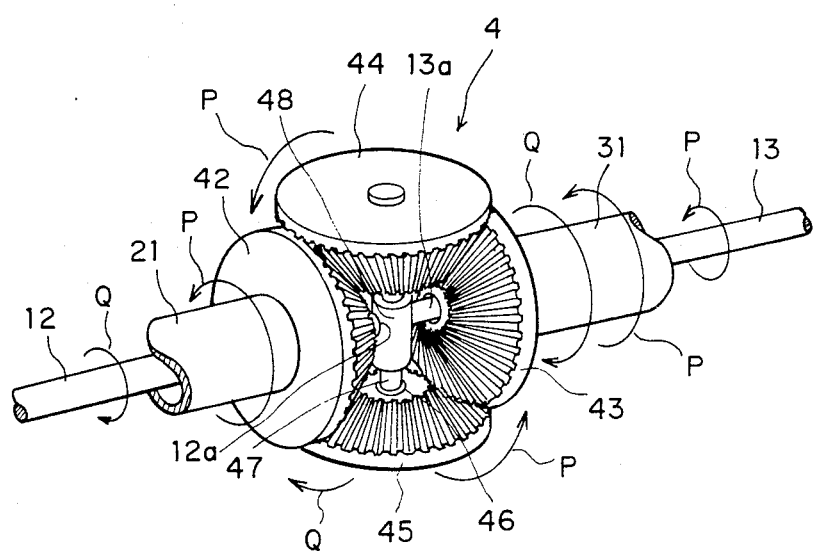
FIG. 6 is partial perspective diagram showing the principal portion of the mechanism shown in FIG. 5.

The detailed structure of the differential actuator 1 includes, as shown in FIG. 5, a virtually cylindrical case 16, the above-mentioned induction motors 2 and 3 and the differential mechanism 4 all integrated within the case 16, the bonnets 18 which function to close both end openings of the case 16 and also to support bearings 17 of the output shafts 12 and 13. The induction motors 2 and 3 produce the torque by the electromagnetic induction acting between stators 20 and 30 fixed on the interior wall of the case 16 and rotors 22 and 32 fixed on the external surface of bored axles 21 and 31. The axles 21 and 31 are supported rotably by bearings 19 secured to the inner flanges 16a of the case 16, and the output shafts 12 and 13 of the differential actuator 1 run through the bore of the axles 21 and 31, respectively, without intervention of rotation with each other. The axles 21 and 31 are coupled at their central end faces with a first and second bevel gears 42 and 43 of the differential mechanism 4. The first and second bevel gears 42 and 43 are in engagement with third bevel gears 44 and 45, which are coupled through bearings 46 with a small differential axis 47 integrated with a cylindrical large differential axis as shown also in FIG. 6. The large differential axis 48 has its external faces fixed to the central ends 12a and 13a of the output shafts 12 and 13, respectively.

Next, the operation of the foregoing differential actuator 1 and its controller will be described. The differential actuator 1 operates such that the axles 21 and 31 of the induction motors 2 and 3 are rotated by the electromagnetic induction in the directions shown by the arrows P and Q, respectively, in FIG. 5. It is first assumed that the rotational speed $\theta1$ of the axle 21 is higher than that $\theta2$ of the axle 31, i.e., $\theta1 > \theta2$, and in this case the differential speed causes the third bevel gears 44 and 45 to rotate around the small differential axis 47 and the differential mechanism 4 rotates around the central axis of the first and second bevel gears 42 and 43 as shown by the arrow P (see FIG. 6). Accordingly, the output shafts 12 and 13 also rotate in the direction P, and their rotational speed is as follows.

$$\theta o = \tfrac{1}{2}(\theta1 - \theta2) \qquad (1)$$

Next, it is assumed that the axle 21 has a rotational speed $\theta1$ which is lower than that $\theta2$ of the axle 31, i.e., $\theta1 < \theta2$, and in this case the third bevel gears 44 and 45 are rotated by the second bevel gear 43 and the differential mechanism 4 rotates in the direction shown by the arrow Q, as opposed to the previous case. Accordingly, the output shafts 12 and 13 also rotate in the direction Q.

Further assumption is made that the axles 21 and 31 have an equal rotational speed, i.e., $\theta1 = \theta2$, and in this case $\theta o = 0$ as given by Equation (1), namely the differential mechanism 4 stops rotating, and the output shafts 12 and 13 also become stationary.

On this account, when the axles 21 and 31 are operated in the normal speed range, the output shafts 12 and 13 can rotate smoothly and easily from a zero speed to a certain low speed, facilitating the speed change of the differential mechanism 4 in the low-speed range.

Next, the operation with both axles 21 and 31 rotated in the same direction will be described. The first case is that the axle 31 of the induction motor 3 in connection with the second bevel gear 43 of the differential mechanism 4 (FIGS. 5 and 6) is rotated in the same direction P as the axle 21. The output shafts 12 and 13 have their rotational speed $\theta o$ added by the speed of the first and second bevel gears 42 and 43 as follows.

$$\theta o = \tfrac{1}{2}(\theta1 + \theta2) \qquad (2)$$

Next, when the axles 21 and 31 rotate in the same direction at an equal speed, i.e., $\theta1 = \theta2$, the third bevel gears 44 and 45 rotate together with the first and second bevel gears 42 and 43, and in this case the output shafts 12 and 13 rotate at the same speed as that of the axles 21 and 31 with the exertion of output power which is a total of outputs of the induction motors 2 and 3.

The output shafts 12 and 13 of the differential actuator 1 have such a wide speed range including a zero speed, and it is expressed as follows.

$$\{-\tfrac{1}{2}(\theta1 + \theta2)\} < \{+\tfrac{1}{2}(\theta1 + \theta2)\} \qquad (3)$$

On the other hand, there is the following steady relationship between the output torques T1 and T2 of the induction motors 2 and 3 and the output torque To of the output shafts 12 and 13.

$$To = T1 + T2 \ldots \qquad (4)$$

When the output torques T1 and T2 are in an equilibrium state, the shaft output torque becomes To=2T1 or To=2T2, and a large torque is produced on the output shafts 12 and 13.

Figure 7:
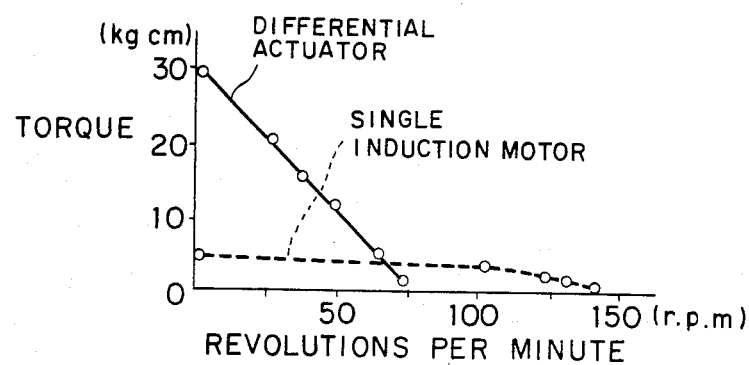
FIG. 7 is a graph showing the induction motor output torque vs. speed characteristics of the above differential actuator.

The following describes the method of controlling the output torque of the differential actuator 1 using the circuit shown in FIG. 4. An experiment was conducted for evaluating the speed vs. torque relation of the output shafts 12 and 13 of the differential actuator 1 for the setting frequencies of the inverters 8 and 9 of 35 Hz and 30 Hz, respectively, and the rotational speed of the induction motor 2 of 937 r.p.m, with the result shown by the solid line in FIG. 7. The maximum output torque reached 29.6 kg/cm as shown. The dashed line in FIG. 7 shows the output torque produced by the conventional system where a single induction motor is driven at a setting frequency with the maximum output torque of 4.7 kg/cm. The maximum output torque indicated by the solid line is far greater than that indicated by the dashed line, proving that the inverter controller for the differential actuator 1 produces a sufficient torque even in the lower speed range and it favorably stands up to practical uses.

Figure 8:
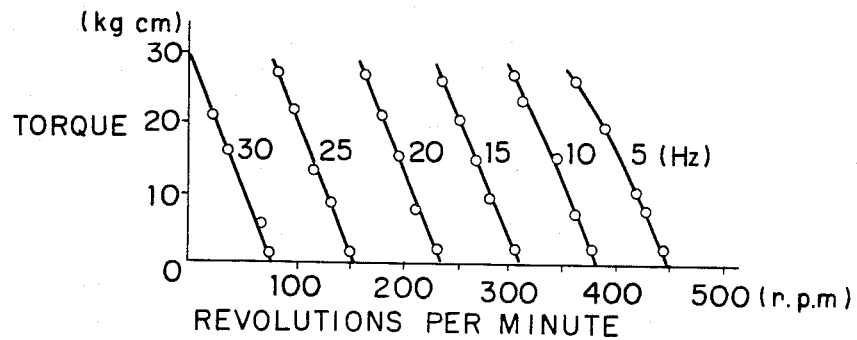
FIG. 8(a) is a graph showing the induction motor output torque vs. speed characteristics of the above differential actuator rotation controller plotted when the setting frequency of the inverter is varied.
FIG. 8(b) is a graph showing the induction motor output torque vs. speed characteristics of the above differential actuator rotation controller plotted when the difference of both frequencies of the driving electric power is controlled by the inverter.

With the setting frequency of the inverter 8 fixed to 35 Hz and that of another inverter 9 varied between 5 Hz and 30 Hz, the drooping torque-speed characteristics, which is identical to that of DC motors, is obtained as shown in FIG. 8(a). Namely, a wide dynamic range of speed control is attained. This achieves the output of sufficiently large torque by a small speed adjustment, and it corresponds to the operation of a differential actuator made up in combination of two DC motors in which the difference of voltages applied to both d.c. motors is adjusted.

FIG. 8(b) shows the result of a performance test conducted using the Prony brake for the inventive differential actuator rotation controller. The graph shows that the output shafts 12 and 13 are maintained at a constant target speed against the variation of the load torque applied to the output shafts 12 and 13 by the Prony brake through the adjustment of the differential frequency made by changing concurrently the setting frequencies for the two inverters 8 and 9.

Figure 9:
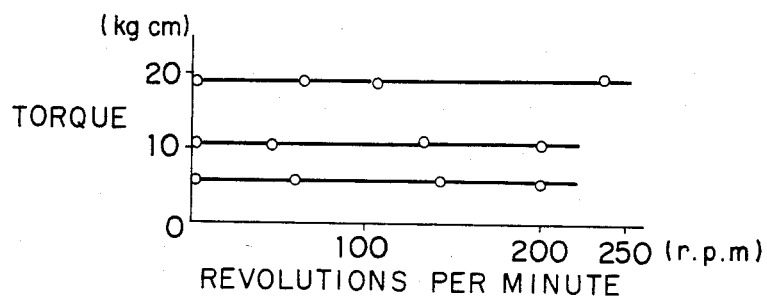
FIG. 9 is a graph showing the induction motor output torque vs. speed characteristics of the differential actuator plotted when the output shaft is loaded.
Figure 8:
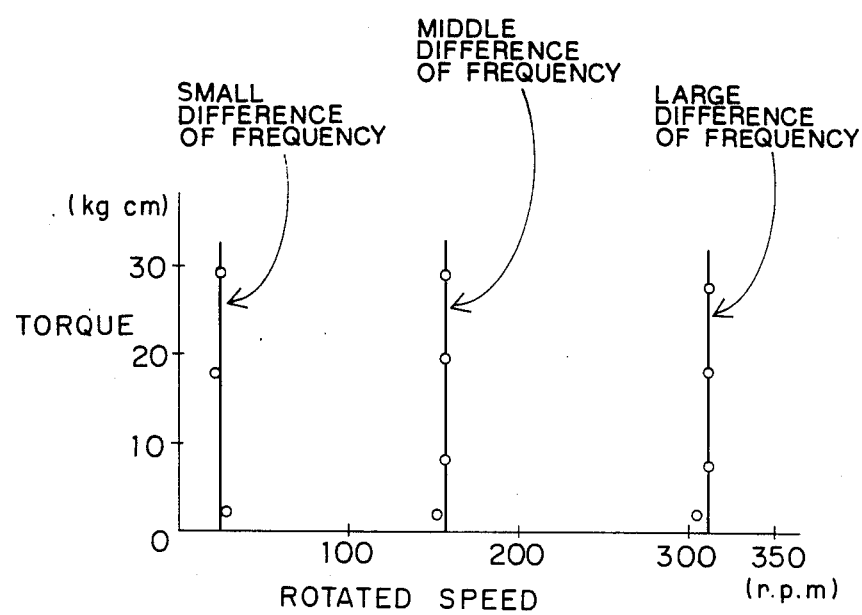

When the output shafts 12 and 13 are loaded by braking, for example, with the setting frequency for the inverter 8 being maintained at 35 Hz and that for the inverter 9 being varied, the output torque vs. speed characteristics of the shafts 12 and 13 becomes as shown in FIG. 9, and in this case the output torque is made virtually constant independently of the rotational speed. Even at a low speed of the output shafts 12 and 13 of the differential actuator 1, the induction motors 2 and 3 constituting part of the actuator 1 are running at high speeds, causing the output shafts 12 and 13 to produce a sufficiently large torque with an extremely small torque ripple despite the slow speed.

The following describes some examples of mechanism to which the differential actuator 1 with associated torque controller described above is applied.

Figure 10:
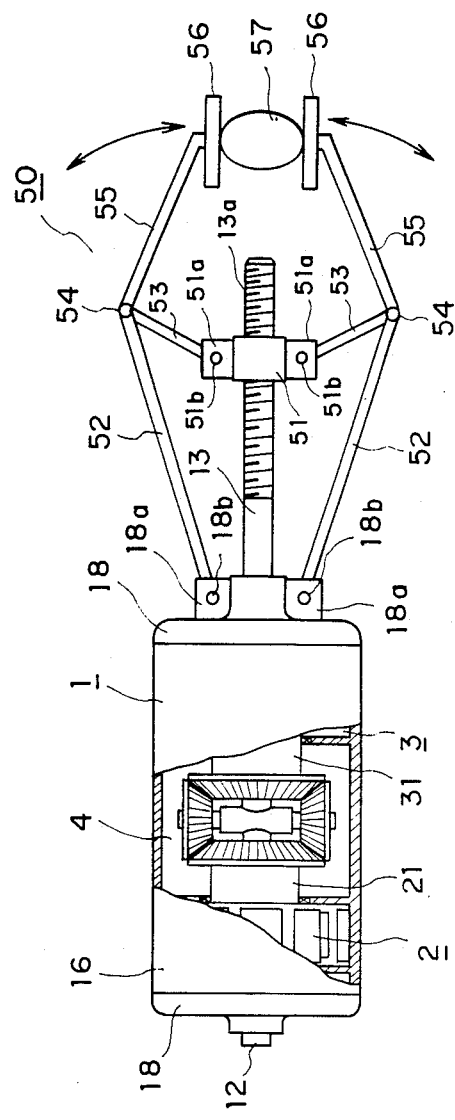
FIG. 10 is a side view of the gripper to which this invention is applied.

FIG. 10 shows the application of this invention to a gripper 50. The differential actuator 1 has virtually same structure as described on FIG. 5, and its one output shaft 13 is extended to have a thread section 13a, on which a nut member 51 is engaged. The nut member 51 is provided with tabs 51a, and similar tabs 18a are provided on the bonnet 18 of the case 16, so that two pairs of arms 52 and 53 are pivoted by pins 18b and 51b on the respective tabs 18a and 51a. The arms 52 and 53 are linked by a pin 54, which also functions to pivotally link grip arms 55 together with the arms 52 and 53. The grip arms 55 are provided at their ends with grip plates 56 confronting each other, and the grip plates 56 hold a workpiece 57 in response to the swing motion of the grip arms 55 caused by the linear motion of the nut member 51 due to the rotation of the output shaft 13 of the differential actuator 1. The grip mechanism 50 by application of the inventive rotation controller and differential actuator 1 enables gripping of the workpiece 57 with a desired force which is easily adjusted to meet various requirements such as the case of holding a soft material. Owing to the characteristics shown in FIG. 9, when the workpiece 57 is in movement, it can be moved from one position to another by being held with a constant grip force irrespective of its moving speed.

Figure 11:
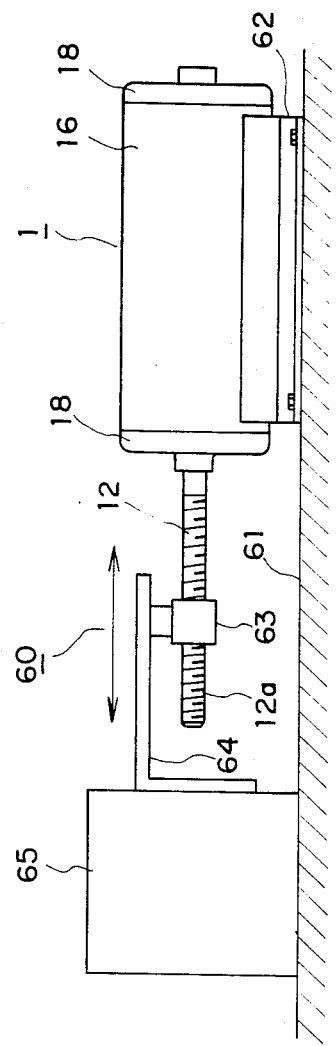
FIG. 11 is a side view of the workpiece pushing apparatus to which this invention is applied.

FIG. 11 shows the application of this invention to a workpiece pushing mechanism 60 used in various automated machines. The differential actuator 1 is fixed on the bed 61 by means of a fixture 62, and its output shaft 12 has a thread section 12a on which is engaged a nut member 63. The nut member 63 has an L-shaped pushing attachment 64, which pushes the workpiece 65 on the bed 61 in the linear motion caused by the rotation of the output shaft 12. The linear motion of the pushing member 64 can be adjusted by torque control for the output shaft 12 in such a manner as to provide for pushing the workpiece 65 slowly with a large torque and retrieving it to the home position quickly with a small torque. It is also possible to feed the workpiece at a constant speed by using the characteristics shown in FIG. 9.

Figure 12:
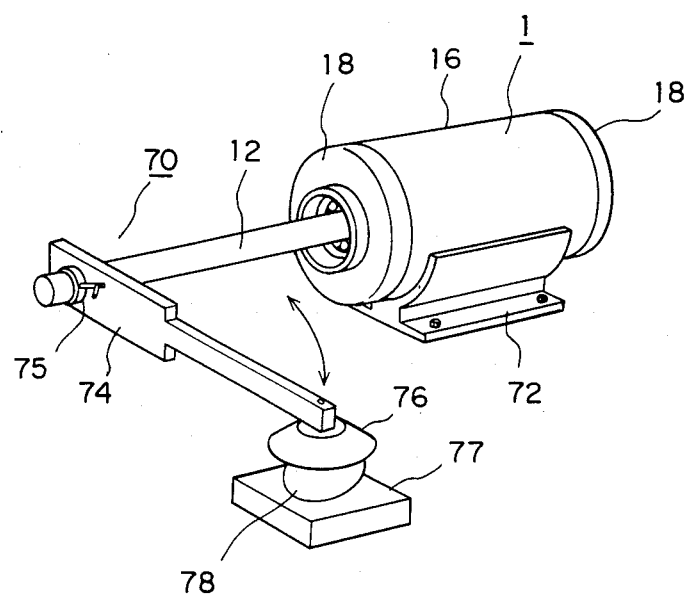
FIG. 12 is a perspective view of the clamper to which this invention is applied.

FIG. 12 shows the application of this invention to a clamp mechanism 70. The clamp mechanism 70 is coupled at its clamp arm 74 through a key member 75 to the end of one output shaft 12 of the differential actuator 1 which is secured to the base by a fixture 72, so that a workpiece 78 is clamped between a clamp member 76 attached at the end of the clamp arm 74 and a clamp pad 77 on the base. The clamp force is produced by the swing motion of the clamp arm 74 caused by the rotation of the output shaft 12, and it can readily be adjusted through the torque control described above.

Figure 13:
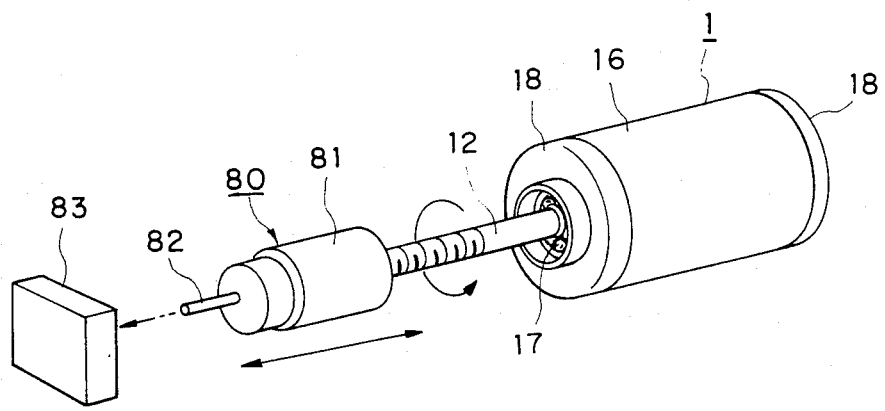
FIG. 13 is a perspective view of the spindle of the machine tool to which this invention is applied.

FIG. 13 is a perspective view of the machine tool drive unit to which the present invention is applied. In the figure, the differential actuator 1 has its output shaft 12 coupled at the end with a spindle 80 by means of a fixture 81. Attached at the top of the spindle 80 is a cutting tool 82 for machining a workpiece 83, which is machined at a constant rotational speed by moving the spindle 80 toward the workpiece 83 at a constant speed through the inventive constant speed control for the output shaft 12 of the differential actuator regardless of the magnitude of load torque.

Figure 14:
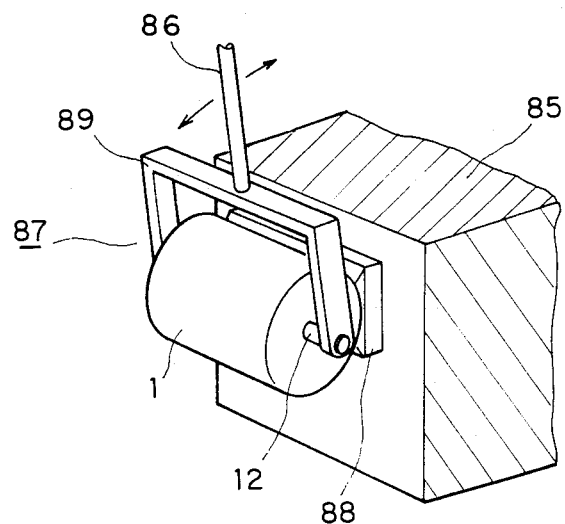
FIG. 14 is a perspective view of the joint section of the arm of the industrial robot to which this invention is applied.

FIG. 14 shows the application of this invention to an industrial robot. The differential actuator 1 is used as part of the joint section 87 which links an arm 86 with the robot main body 85. The joint section 87 includes a U-shape rotary flange 89 with its both ends coupled with the output shaft 12 of the differential actuator 1 which is fixed on the main body 85 by means of a fixture 88. In this arrangement, the output shaft 12 has its rotational speed controlled arbitrarily including stoppage regardless of the load torque applied to the arm 86, whereby the constant speed control for the arm 86 is accomplished.

FIG. 15 shows the application of this invention to a conveyer mechanism. The differential actuator 1 has its output shaft 12 provided with a thread section 12a, which is in engagement with a hinge section 93a of a supporting board 93 standing at one end of a table 91 having a guide section 92, and the output shaft 12 has its end fixed on one end of a slide member 94 which slides on the guide section 92 along the axis of the output shaft 12. A slider section 94a is formed at the bottom of the slide member 94, and a workpiece 95 is placed on the slide member 94. In this arrangement, the slide member 94 can be fed at arbitrary speeds in the speed range from stoppage to the normal operating speed, and the conveyer mechanism 90 movable at constant speed can readily be assembled with a machine tool or the like.

The inventive rotation control apparatus incorporates two inverters having constant but separate voltage/frequency characteristics placed between two induction motors and the power source for the differential actuator producing the output torque by the differential speed between the two induction motors. On this account, the rotational speed of both induction motors can be controlled separately by the associated inverters, whereby the output torque on the shafts of the differential actuator can be controlled stably in the extended speed range from stoppage to the normal operating speed.

As described above in detail, the inventive rotation control apparatus for the differential actuator having two induction motors and a differential mechanism incorporates a speed controller for controlling the rotational speed of both induction motors at individual frequencies so that the actuator output shaft is controlled to constant speeds ranging from stoppage to the normal operating speed based on the difference of speeds of both induction motors, whereby the rotational speed of the output shaft is controlled accurately to desired speeds independently of the magnitude of the load torque applied to the output shaft.

What is claimed is:

1. A rotation control apparatus used for a differential actuator having two induction motors and a differential mechanism driven by said motors for producing on an output shaft a constant torque at varying rotational speeds of said induction moors, said apparatus comprising two inverters having individual voltage vs. frequency output characteristics and connected respectively between said induction motors and a power source which supplies power to said induction motors;
   wherein one of said two inverters provides a constant-frequency power to one of said induction motors and the other inverter provides a variable-frequency power to the other of said induction motors;
   said apparatus controlling said differential actuator to produce a constant torque on the output shaft thereof at a differential speed between said induction motors at each variable frequency; and
   a digital torque sensor attached to said output shaft of said differential actuator for measuring the output torque on said output shaft in a digital manner, said digital torque sensor having a measured value read out on a torque meter, torque control being implemented by setting a frequency of said variable-frequency inverter.

2. A differential actuator rotation control apparatus having two induction motors and a differential mechanism driven by said motors for producing an an output shaft a constant torque at varying rotational speeds of said induction motors, said apparatus comprising two inverters having individual voltage vs. frequency output characteristics and connected respectively between said induction motors and a power source which supplies power to said induction motors, and two polyphase power meters each connected between one of said inverters and a corresponding one of said motors, said polyphase power meters measuring power supplied to said respective induction motors.

3. A differential actuator rotation control apparatus having two induction motors and a differential mechanism driven by said motors for producing on an output shaft a constant torque at varying rotational speeds of said induction motors, said apparatus comprising two inverters having individual voltage vs. frequency output characteristics and connected respectively between said induction motors and a power source which supplies power to said induction motors, said two induction motors and said differential mechanism being constructed in an integral manner within a housing, said two inverters being connected to said motors to control the constant torque of said output shaft.

4. A rotation control apparatus used for a differential actuator having two induction motors and a differential mechanism for producing on an output shaft a constant torque at varying rotational speeds of said induction motors, said apparatus comprising two inverters each connected between a corresponding one of said induction motors and a power source which supplies power to said induction motors and adapted to set frequencies of power supplied to said induction motors so as to control the rotational speed of said output shaft based on the difference of frequencies of power supplied to said induction motors;
   wherein one of said two inverters provides a constant-frequency power to one of said induction motors and the other inverter for provides a variable-frequency power to the other of said induction motors;
   said apparatus controlling said differential actuator to produce a constant torque on the output shaft thereof at a differential speed between said induction motors at each variable frequency; and
   a digital torque sensor attached to said output shaft of said differential actuator for meauring the output torque on said output shaft in a digital manner, said digital torque sensor having a measured value read out on a torque meter, torque control being implemented by setting a frequency of said variable-frequency inverter.

5. A differential actuator for producing a differential output from two induction motors and outputting a high torque driving force at low speed, each of said induction motors being connected to a power source by a corresponding one of two inverters, comprising:
   (a) two axially-aligned induction motors arranged to be driven at selected rotational speeds;
   (b) two aligned hollow input shafts, each of said induction motors being connected to a corresponding one of said hollow input shafts for driving said shafts;
   (c) output shafts aligned with said induction motors and extending through said hollow input shafts and rotatable relative to said hollow input shafts; and
   (d) differential means connecting said hollow input shafts and said output shafts.

6. The differential actuator of claim 5 wherein said differential means comprises:
   (a) two oppositely facing side bevel gears arranged on a first axis, each of said bevel gears being attached to a corresponding one of said hollow input shafts, said hollow input shafts being rotatable at different speeds by said induction motors; and (b) two oppositely facing pinion bevel gears engaging said side bevel gears, said pinion bevel gears being arranged on a second axis which is perpendicular to said first axis; and (c) means disposed on said second axis and connected to said output shafts.

7. A differential actuator for providing a differential output from two motors and outputting a high torque driving force at low speed, each of said motors being controlled by a corresponding one of two inverters, comprising:

(a) a case;

(b) two motors arranged within said case at opposite ends thereof and to be driven at selected rotational speeds;

(c) two hollow input shafts, each of said motors being connected to a corresponding one of said hollow input shafts for driving said shafts;

(d) two oppositely facing side bevel gears arranged on a first axis, each of said bevel gears being attached to a corresponding one of said hollow input shafts, said hollow input shafts being rotatable at different speeds by said motors;

(e) two oppositely facing pinion bevel gears engaging said two side bevel gears, said pinion bevel gears being arranged on a second axis which is perpendicular to said first axis;

(f) a differential shaft extending between said pinion bevel gears along said second axis;

(g) output shafts extending through said hollow input shafts and through opposite ends of said case and being rotatable relative to said hollow input shafts, said output shafts being connected at their inner ends to said differential shaft.

8. A differential actuator according to claim 7, wherein said motors including stators mounted on the inner circumferential surfaces of said case at opposite ends thereof, and rotors disposed within said stators, each of said hollow input shafts being secured to a corresponding one of said rotors.

9. A differential actuator according to claim 7, wherein said motors are alternating current (AC) motors having the same output characteristics.

10. A differential actuator according to claim 7, wherein said casing includes sealed end walls, and bearing members disposed in the central area of each of said end walls for rotatably supporting said output shafts.

* * * * *

UNITED STATES PATENT AND TRADEMARK OFFICE
CERTIFICATE OF CORRECTION

PATENT NO. : 4,760,314

DATED : July 26, 1988

INVENTOR(S) : Naotake Mohri et al.

It is certified that error appears in the above-identified patent and that said Letters Patent is hereby corrected as shown below:

Column 2, line 52, after "a" insert --partial-- and after "section," delete "partial";
          line 55, after "is" insert --a--.
Column 3, line 61, after "axis" insert --48--.
Column 4, line 3, "81" should be --θ1--.
Column 7, line 39, "moors" should be --motors--;
          line 62, "an" (first occurrence) should be --on--.
Column 8, line 32, delete "for";
          line 40, "meauring" should be --measuring--.

Signed and Sealed this

Nineteenth Day of December, 1989

Attest:

JEFFREY M. SAMUELS

Attesting Officer     Acting Commissioner of Patents and Trademarks